US012807285B2

(12) United States Patent
Botwright et al.

(10) Patent No.: US 12,807,285 B2
(45) Date of Patent: Nov. 24, 2026

(54) METHOD AND SYSTEM FOR HANDLING COMPONENTS OF AN OFFSHORE WIND TURBINE

(71) Applicant: Vestas Wind Systems A/S, Aarhus N. (DK)

(72) Inventors: Adrian Botwright, Sabro (DK); Ole Jacob Wang Nielsen, Aarhus V (DK); Rasmus Clark Marker, Randers SØ (DK); Claus Hald Therkildsen, Ryomgård (DK)

(73) Assignee: Vestas Wind Systems A/S, Aarhus N (DK)

( * ) Notice: Subject to any disclaimer, the term of this patent is extended or adjusted under 35 U.S.C. 154(b) by 296 days.

(21) Appl. No.: 18/691,080

(22) PCT Filed: Aug. 3, 2022

(86) PCT No.: PCT/DK2022/050162
§ 371 (c)(1),
(2) Date: Mar. 12, 2024

(87) PCT Pub. No.: WO2023/041130
PCT Pub. Date: Mar. 23, 2023

(65) Prior Publication Data

US 2024/0400169 A1 Dec. 5, 2024

(30) Foreign Application Priority Data

Sep. 20, 2021 (DK) .................................. 202170458

(51) Int. Cl.
*B63B 77/10* (2020.01)
*F03D 13/25* (2016.01)
(Continued)

(52) U.S. Cl.
CPC .............. *B63B 77/10* (2020.01); *F03D 13/25* (2016.05); *F03D 13/40* (2016.05); *F03D 80/50* (2016.05)

(58) Field of Classification Search
CPC ......... B63B 77/10; F03D 13/25; F03D 13/40; F03D 80/50; F05B 2230/61;
(Continued)

(56) References Cited

U.S. PATENT DOCUMENTS

2010/0316450 A1 12/2010 Botwright
2017/0305507 A1 10/2017 Schinkel et al.
2020/0056592 A1 * 2/2020 Geraets ................... F03D 80/50

FOREIGN PATENT DOCUMENTS

DK 201800520 A1 8/2019
GB 2577643 A 4/2020
(Continued)

OTHER PUBLICATIONS

Danish Patent and Trademark Office, technical examination issued in corresponding Application No. PA 2021 70458, dated Apr. 12, 2022.
(Continued)

*Primary Examiner* — Sheetal R Paulson
(74) *Attorney, Agent, or Firm* — Wood, Herron & Evans, LLP

(57) ABSTRACT

A method of replacing a component (28*b*) of an offshore wind turbine (10) includes providing a sea vessel (30) having a transport system (50)) with a base (52), an elongate platform (54) connected to the base (52), and a transport frame (56*a*, 56*b*) for receiving a component (28*b*) of the wind turbine (10). The sea vessel (30) is positioned such that its deck (40) is separated from the wind turbine (10) by more than a maximum working distance (72) of a crane (26) onboard the wind turbine (10), and further positioned such
(Continued)

that in an extended position, the transport frame (56*a,* 56*b*) is within the maximum working distance (72) of the crane (26), and in a retracted position, the transport frame (56*a,* 56*b*) is outside of the maximum working distance (72). The method includes arranging the transport frame (56*a,* 56*b*) in the extended position, lowering a component (28*b*) of the wind turbine (10) using the crane (26), and placing the component (28*b*) on the transport frame (56*a,* 56*b*). A transport system (50) for handling wind turbine components (28*a,* 28*b*) is also disclosed.

17 Claims, 18 Drawing Sheets

(51) Int. Cl.
*F03D 13/40* (2016.01)
*F03D 80/50* (2016.01)

(58) Field of Classification Search
CPC ......... F05B 2230/6102; F05B 2240/95; Y02E 10/72; Y02E 10/727
See application file for complete search history.

(56) References Cited

FOREIGN PATENT DOCUMENTS

| | | | | |
|---|---|---|---|---|
| KR | 20190128432 A | * 11/2019 | ............ | F03D 13/25 |
| WO | 2011108933 A1 | 9/2011 | | |
| WO | 2012007002 A2 | 1/2012 | | |

OTHER PUBLICATIONS

International Searching Authority, International Search Report and Written Opinion issued in corresponding PCT Application No. PCT/DK2022/050162, dated Nov. 18, 2022.

* cited by examiner

METHOD AND SYSTEM FOR HANDLING COMPONENTS OF AN OFFSHORE WIND TURBINE

TECHNICAL FIELD

This invention relates generally to wind turbines, and more particularly to a transport system for a sea vessel used in repair or replacement processes of components of an offshore wind turbine, and to a method of handling offshore wind turbine components using such a transport system on a sea vessel.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades and supported in the nacelle by means of a shaft. The shaft couples the rotor either directly or indirectly with a generator, which is housed inside the nacelle. Consequently, as wind forces the blades to rotate, electrical energy is produced by the generator. Wind turbines may be located either on a land mass (onshore) or within a body of water (offshore).

Over time, the wind turbine components, such as the generator, gearboxes, heat exchanges and the like, may have to be repaired or replaced. To facilitate repair or replacement processes, the nacelle may include or be fitted with a crane configured to lower old components from the nacelle to the ground or a water vessel and lift repaired or replacement components up to the nacelle. The lowering and lifting process is relatively straightforward with an onshore wind turbine, as the ground does not move relative to the wind turbine and ground equipment can be positioned close to the wind turbine. When the wind turbine is offshore, however, lowering and lifting wind turbine components can be challenging as the water may move relative to the wind turbine. Consequently, specialized sea vessels are typically used to facilitate the lowering and lifting of wind turbine components to and from the offshore wind turbine.

In existing approaches, sea vessels connect to the wind turbine with elaborate and complex linkages to allow the sea vessel to accommodate the moving water around the wind turbine while the components are being lowered and raised by a crane. These elaborate and complex linkages are expensive to design, install, maintain, and operate, which increases the cost of the repair or replacement process. Furthermore, if the water in which the wind turbine resides is turbulent, it may be difficult to safely connect to the wind turbine without possibly damaging the wind turbine.

It may be seen that what is needed is an improved method of replacing a component of an offshore wind turbine, and a transport system for handling components of an offshore wind turbine on a sea vessel. Preferably, the invention alleviates, mitigates, or eliminates one or more of the above or other disadvantages singly or in any combination.

SUMMARY

In further detail it can be found that what is needed, therefore, is a sea vessel and associated transport system that is configured to receive and provide wind turbine components from and to an offshore wind turbine that remains a safe distance away from and unattached to the wind turbine during the lowering and lifting process.

To these and other ends, a method of replacing a component of an offshore wind turbine, where the offshore wind turbine includes an onboard crane having a maximum working distance, is disclosed. The method includes providing a sea vessel adjacent to but spaced from the offshore wind turbine and which includes a transport system that remains unattached to the wind turbine during use. The transport system includes a base connected to a deck of the sea vessel, an elongate platform connected to the base for supporting the platform, and at least one transport frame carried on the elongate platform for receiving a component of the offshore wind turbine. The transport system is movable relative to the base between a retracted position and an extended position. The retracted position locates the at least one transport frame over the deck of the sea vessel and the extended position locates the at least one transport frame over water at a distance away from the deck of the sea vessel.

The sea vessel may be positioned such that the deck of the sea vessel is separated from the wind turbine by a distance greater than the maximum working distance of the onboard crane. The sea vessel may be further positioned such that: i) when the at least one transport frame is in the extended position, at least part of the at least one transport frame is within the maximum working distance of the onboard crane; and ii) when the at least one transport frame is in the retracted position, the at least one transport frame is outside of the maximum working distance of the onboard crane. With this arrangement, the method may further include arranging the at least one transport frame in the extended position; lowering a component of the offshore wind turbine using the onboard crane; and with the at least one transport frame in the extended position, placing the component on the at least one transport frame of the transport system.

In one embodiment, the method may further include moving the at least one transport frame from the extended position to the retracted position such that the component is located over the deck of the sea vessel and, with the at least one transport frame in the retracted position, removing the component from the transport system. In another embodiment, the method may further include placing another component on the at least one transport frame of the transport system and moving the at least one transport frame from the retracted position to the extended position such that the another component is located over water. In this embodiment, and with the at least one transport frame in the extended position, the method may additionally include raising the another component from the at least one transport frame using the onboard crane of the offshore wind turbine.

In one embodiment, the at least one transport frame includes a first transport frame and a second transport frame, and the step of placing the component on the at least one transport frame may further include placing the component on the first transport frame. Moreover, the step of placing the another component on the at least one transport frame may further include placing the another component on the second transport frame. In one embodiment, the another component may be placed on the second transport frame prior to the component being placed on the first transport frame. In this way, for example, when the transport frame is moved from the retracted position to the extended position, the onboard crane may place the component in the first transport frame and attach to the another component in the second transport frame with no or minimal movement of the transport frames.

In one embodiment, the at least one transport frame may be fixed to the platform and moving the at least one transport frame between the extended position and the retracted position may further include moving the platform relative to the base. In another embodiment, the platform may include a track and the transport system may further include a carriage movably connected to the track, wherein the carriage includes the at least one transport frame. In this embodiment, moving the at least one transport frame between the extended position and the retracted position may further include moving the carriage relative to the track. In yet another embodiment, the platform may include a first platform segment and a second platform segment, wherein the second platform segment is rotatably coupled to the first platform segment and rotatable between a raised position and a lowered position. In this embodiment, the method may further include positioning the second platform segment in the lowered position prior to or contemporaneous with the step of arranging the at least one transport frame in the extended position.

In a further embodiment, a transport system for handling components of an offshore wind turbine on a sea vessel is disclosed. The transport system includes a base for connection to a deck of the sea vessel, an elongate platform configured to be connected to the base for supporting the platform and remain unattached to the wind turbine during use, and at least one transport frame for receiving a component of the offshore wind turbine. The at least one transport frame may be configured to be movable relative to the base between a retracted position and an extended position, wherein the retracted position locates the at least one transport frame over the deck of the sea vessel, and the extended position locates the at least one transport frame over water at a distance away from the deck of the sea vessel.

In one embodiment, the at least one transport frame may be fixed to the platform, and the platform may be movable relative to the base to move the at least one transport frame between the retracted position and the extended position. In another embodiment, the platform may include a track, and the transport system may further include a carriage configured to be movably connected to the track, wherein the carriage includes the at least one transport frame and is movable relative to the track to move the at least one transport frame between the retracted position and the extended position. In one embodiment, the transport system may include a drive device for moving the at least one transport frame between the retracted position and the extended position.

The at least one transport frame may include a first transport frame and a second transport frame arranged in a side-by-side manner. For example, in one embodiment, the platform may define a longitudinal direction parallel to the elongate extent of the platform, and the first and second transport frames may be arranged side-by-side in the longitudinal direction. In another embodiment, the platform may define a transverse direction perpendicular to the elongate extent of the platform, and the first and second transport frames may be arranged side-by-side in the transverse direction.

In one embodiment, the platform may further include a first platform segment, a second platform segment, and a pivot mechanism connecting the first platform segment and the second platform segment. This arrangement permits rotational movement of the second platform segment relative to the first platform segment between a raised position and a lowered position.

In a further embodiment, a sea vessel including the transport system according to the features described above is also disclosed.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
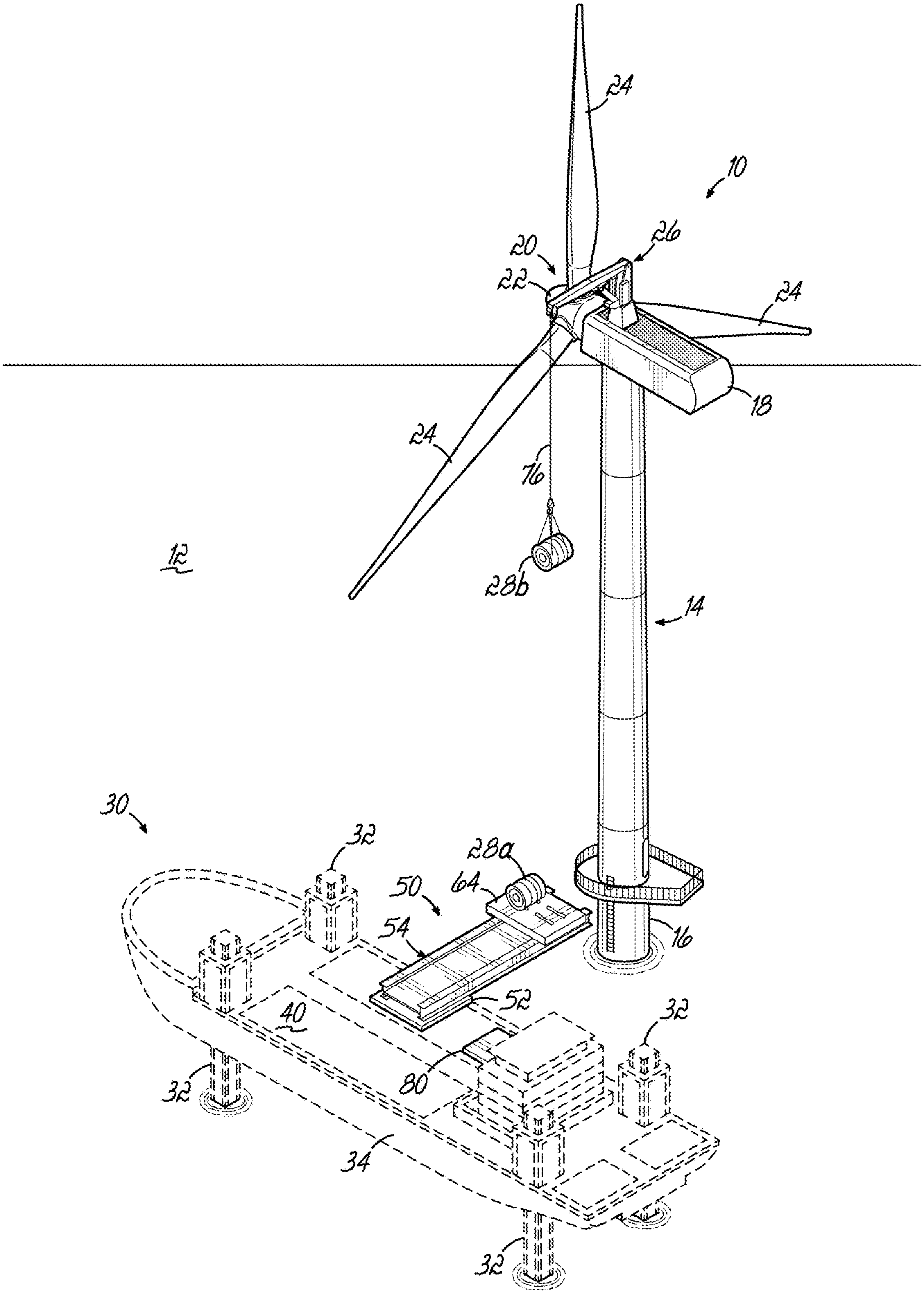
FIG. 1 is a perspective view of an offshore wind turbine with a jack-up vessel positioned adjacent thereto, the jack-up vessel having a transport system according to one embodiment of the invention.

FIG. 1 depicts a wind turbine 10 in an offshore location, i.e., in a body of water 12. The wind turbine 10 includes a tower 14 anchored to the bottom of the body of water 12 through a suitable foundation 16, a nacelle 18 disposed at the upper end of the tower 14, a rotor 20 operatively coupled to a generator (not shown) housed inside the nacelle 18, and a gearbox (not shown) also housed inside the nacelle 18. In addition to the generator and gearbox, the nacelle 18 may house various components needed to convert wind energy into electrical energy and to operate and optimize the performance of the wind turbine 10. The tower 12 supports the load presented by the nacelle 18, rotor 20, and other wind turbine components housed inside the nacelle 18 and operates to elevate the nacelle 18 and rotor 20 to a height above the water level at which air currents having lower turbulence and higher velocity are typically found.

The rotor 20 includes a hub 22 and one or more (e.g., three) blades 24 attached to the hub 22 at locations distributed about the circumference thereof. The blades 24 project radially outward from the hub 22 and are configured to interact with passing air currents to produce rotational forces that cause the hub 22 to spin about its longitudinal axis. This rotational energy is delivered to the generator housed within the nacelle 18 and converted into electrical power.

An onboard crane 26 may be positioned in or on the nacelle 18 and is configured to lift a wind turbine component 28*a* (FIG. 2A) from a transport system 50 (FIG. 2A) to the nacelle 18 or lower a wind turbine component 28*b* from the nacelle to the transport system 50. For example, the movement of wind turbine components may be part of a repair or replacement process for the offshore wind turbine 10. In one embodiment, the onboard crane 26 may permanently reside in or on the wind turbine 10. In an alternative embodiment, however, the onboard crane 26 may be temporary and connected to the nacelle 18 for the specific purpose of replacing the wind turbine component 28*b*. Such cranes are generally known in the wind turbine industry and thus will not be described in further detail for sake of brevity.

To this end, a sea vessel 30, such as a jack-up vessel, may be positioned adjacent to the wind turbine 10. As is generally known, the jack-up vessel 30 includes extendible legs 32 at the approximate corners of the jack-up vessel 30 that are configured to move downwardly from the main hull 34 of the jack-up vessel 30 and contact the seabed. Upon contacting the seabed, the extendible legs 32 are extended further so as to lift the main hull 34 upwardly and away from the body of water 12 so that the main hull 34 will not interact/move in the presence of waves, a rise/fall in tide, or wind.

Advantageously, in this jacked up configuration, the jack-up vessel 30 remains substantially stationary relative to the offshore wind turbine 10. Consequently, neither the jack-up vessel 30 nor the transport system 50 needs to be physically attached to the wind turbine 10 to replace wind turbine components from the wind turbine 10. This is in contrast to many existing arrangements where the system for handling the wind turbine components is connected directly to the wind turbine.

Figure 2:
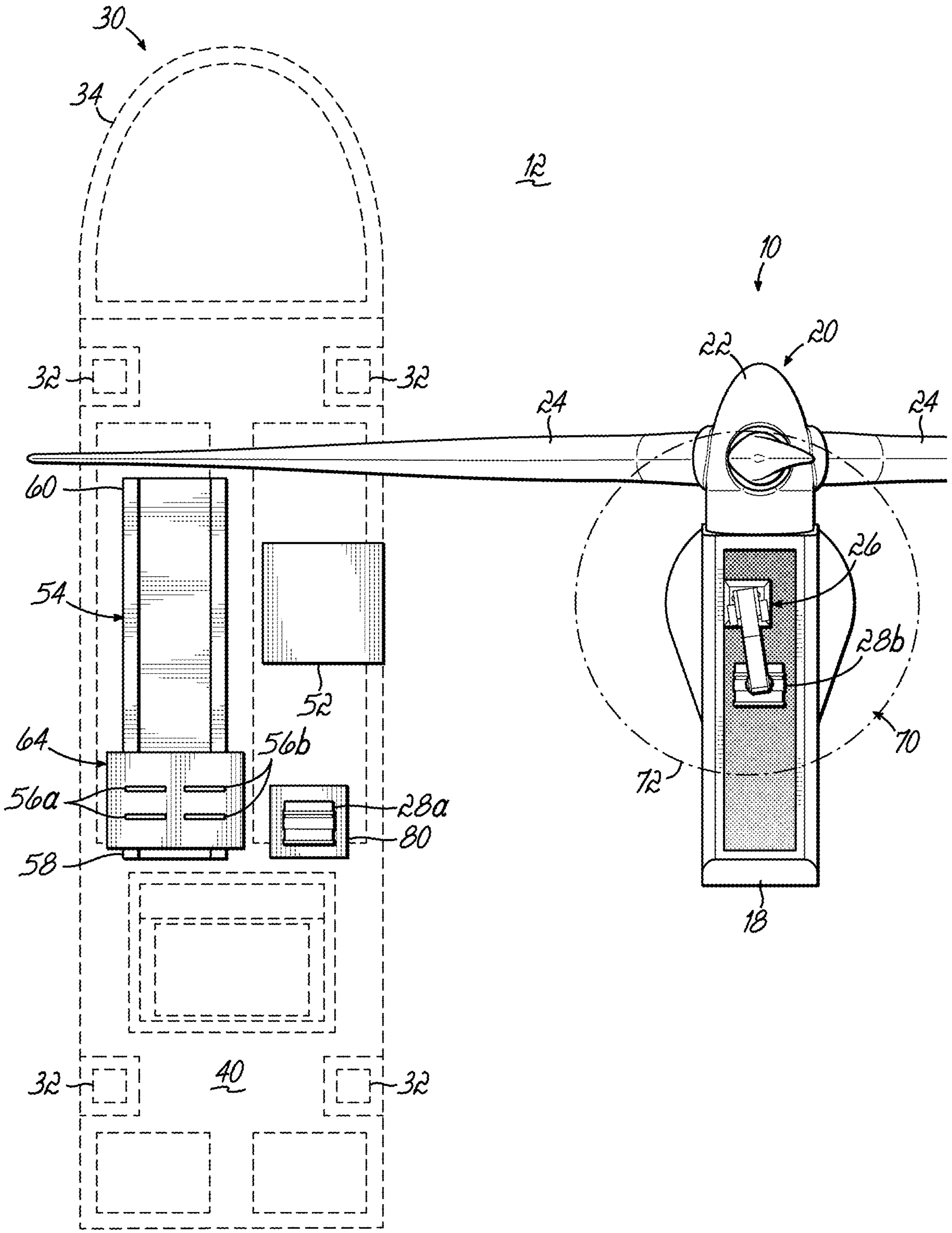
FIG. 2 is a plan view of the wind turbine and jack-up vessel of FIG. 1 with the transport system partially disassembled and stored on the deck of the jack-up vessel.
Figure 2A:
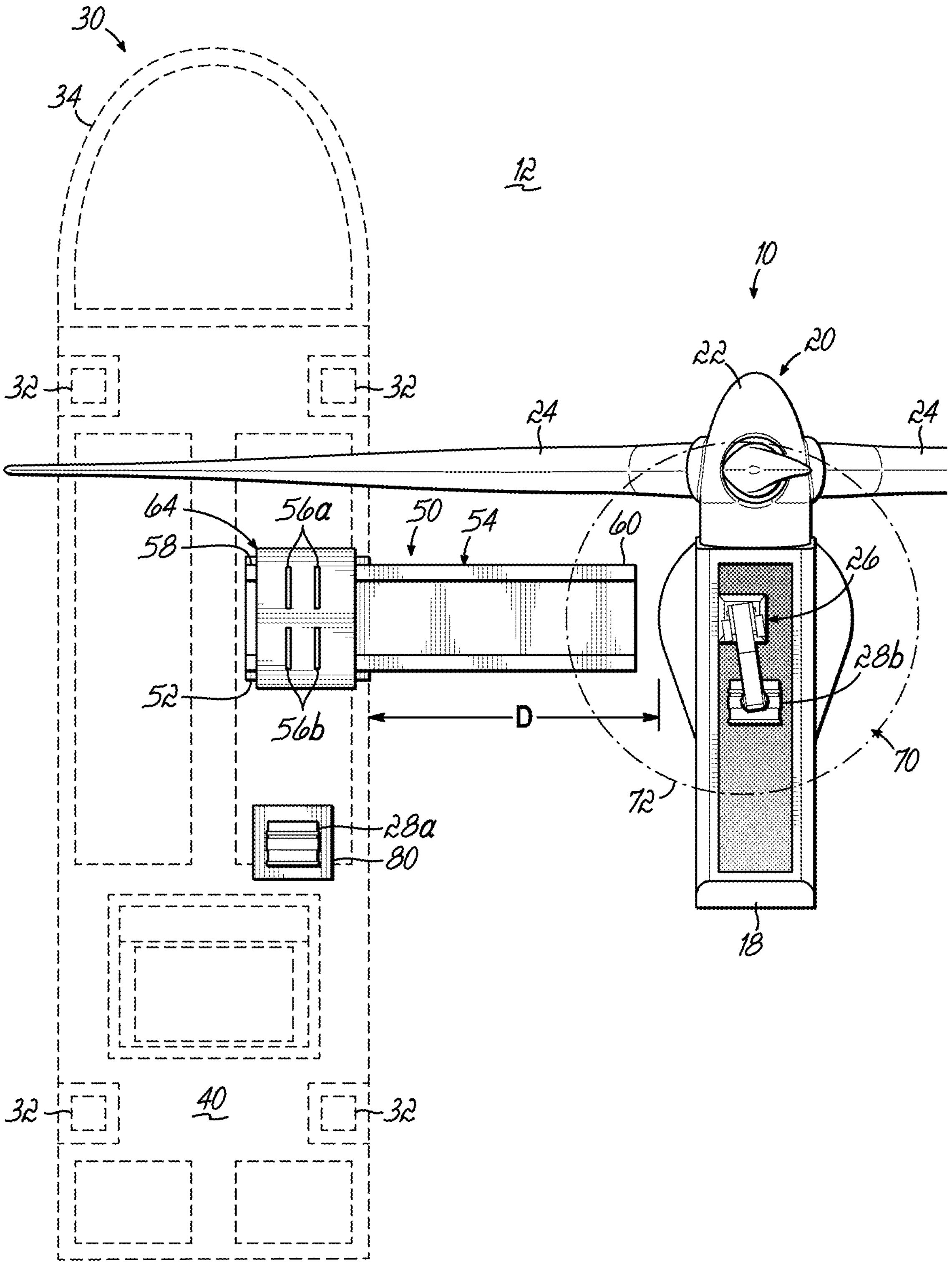
FIGS. 2A-2G are enlarged plan views of the wind turbine and jack-up vessel of FIG. 1 illustrating a sequence of steps for replacing one component of the offshore wind turbine with another component.

The invention includes a transport system and a method of replacing a wind turbine component of the offshore wind turbine 10 using the transport system. FIGS. 2-2G depict one embodiment of the transport system and the various method steps for replacing a wind turbine component. Again, neither the jack-up vessel nor the transport system forms a positive, supportive connection to the wind turbine 10 during use.

FIG. 2 is a plan view looking down on the jack-up vessel 30 and the wind turbine 10. The transport system 50 is positioned on a deck 40 of the jack-up vessel 30. In FIG. 2, the transport system 50 is partially disassembled to illustrate how it may look when the jack-up vessel 30 arrives alongside the wind turbine 10. The transport system 50 includes a base 52 that is coupled to the deck 40 of the jack-up vessel 30 (e.g., by bolts, clamps, or other fasteners). The transport system 50 further includes an elongate platform 54 with two transport frames 56*a*, 56*b*. The elongate platform 54 defines a longitudinal direction parallel to the elongate extent of the platform 54 and further defines a transverse direction perpendicular to the elongate extent of the platform 54. In FIGS. 2-2G, the transport frames 56*a*, 56*b* are arranged side-by-side in the transverse direction. Each of the transport frames 56*a*, 56*b* are configured to hold the wind turbine components 28 residing on the deck 40 of the jack-up vessel 30 or located in or on the nacelle 18. The size and shape of the wind turbine component 28*a*, 28*b* may vary, so the transport frames 56*a*, 56*b* may be changed out to accommodate those different wind turbine components 28*a*, 28*b*.

Upon arrival of the jack-up vessel 30 adjacent the wind turbine 10, the extendible legs 32 may be extended until the jack-up vessel 30 is lifted to be out of the influence of the waves, current, and wind. As such, the jack-up vessel 30 remains a fixed distance, D, from the closest side of the wind turbine tower 14 and is also unattached from the wind turbine 10 as illustrated in FIG. 2A. Also, in this configuration, the deck 40 of the jack-up vessel 30 remains largely at a fixed height relative to the wind turbine 10. After the jack-up vessel 30 is lifted, a first end 58 of the platform 54 is attached to the base 52 and a second end 60 of the platform extends out away from the deck 40 of the jack-up vessel 30 and over the body of water 12. The crane 26 on the nacelle 18 has a working zone 70 (FIG. 2) in which the crane 26 can lift or lower wind turbine components 28*a*, 28*b*. The outer most perimeter of the working zone 70 is a maximum working distance 72 (FIG. 2), which is the farthest distance that a lift line 76 (FIG. 1) of the crane 26 can extend away from the pivot point of the crane 26. The fixed distance, D, is greater than the maximum working distance 72 of the crane 26 such that the jack-up vessel 30 is outside of the working zone 70 of the onboard crane 26. Thus, it is not possible for the onboard crane 26 to directly access the deck 40 of the jack-up vessel 30.

In this embodiment, the transport system 50 further includes a carriage 64 upon which the transport frames 56*a*, 56*b* are attached. The carriage 64 is configured to move relative to the platform 54 between the first end 58 and the second end 60. When the carriage 64 is proximate the first end 58 (FIGS. 2A, 2B), the carriage 64 and its transport frames 56*a*, 56*b* are considered to be in a retracted position relative to the base 52. In the retracted position, the carriage and its transport frames 56*a*, 56*b* are positioned over the deck 40 of the jack-up vessel 30 and outside the maximum working distance 72 of the crane 26. When the carriage 64 is proximate the second end 60 (FIGS. 2C-2F), the carriage 64 and the transport frames 56*a*, 56*b* are considered to be in an extended position. In the extended position, the transport frames 56*a*, 56*b* are over the water at a distance, d, away from the deck 40 of the jack-up vessel 30. In the extended position, at least a part of the carriage 64 and its transport frames 56*a*, 56*b* are within the maximum working distance 72 of the crane 26.

Figure 2B:
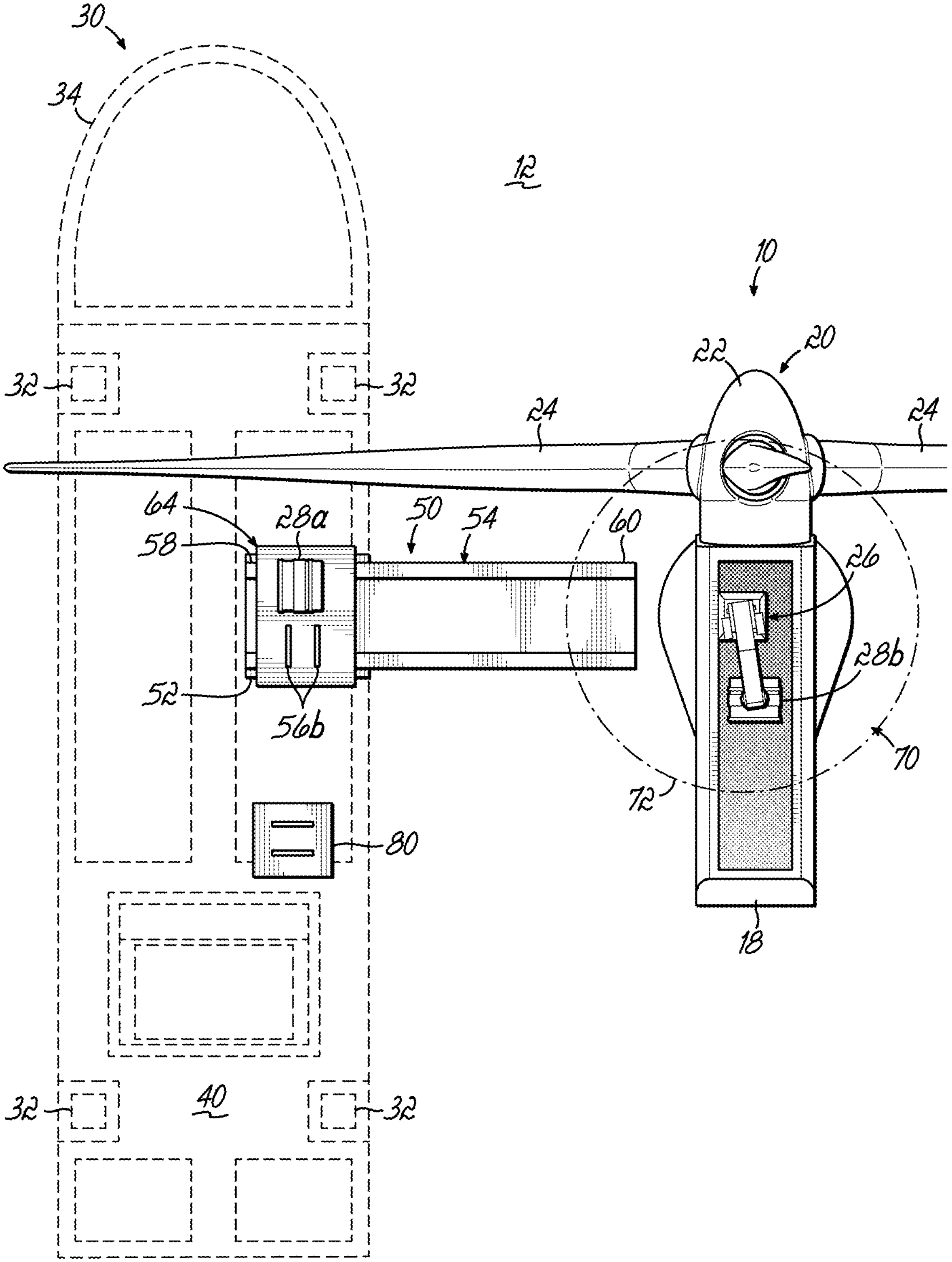

In FIG. 2B, the wind turbine component 28*a* is positioned on one of the transport frames 56*a*, which is on the carriage 64. This may be achieved, for example, by a crane on the jack-up vessel 30 (not shown) capable of lifting the wind turbine components being replaced. The carriage 64 and its transport frames 56*a*, 56*b* are shown in the retracted position relative to the base 52. The wind turbine component 28*b* is connected to the crane 26, but otherwise remains inside the nacelle 18.

Figure 2C:
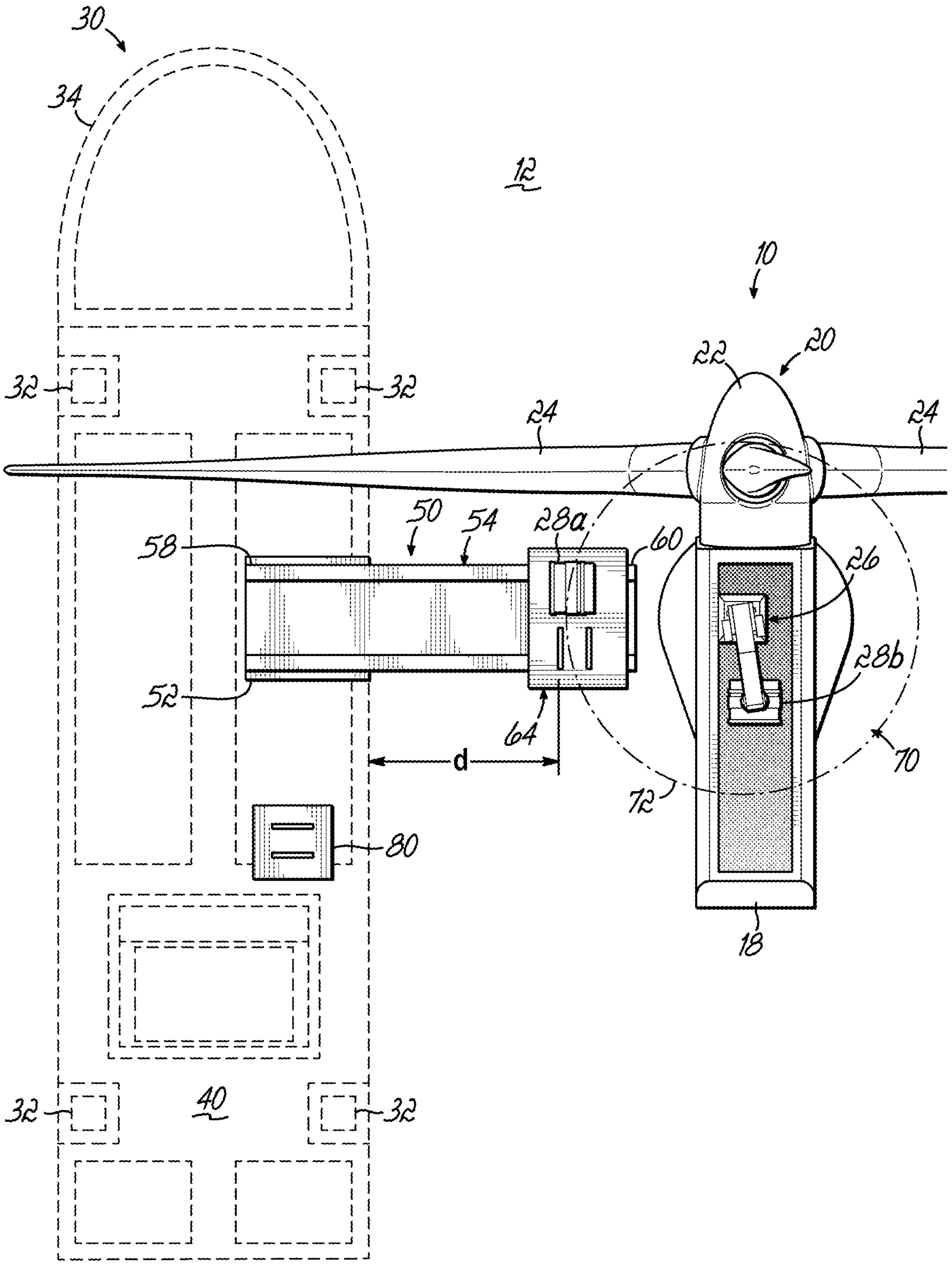

In FIG. 2C, the carriage 64 and its transport frames 56*a*, 56*b* have been arranged in the extended position. In this arrangement, at least part of the carriage 64, the transport frames 56*a*, 56*b*, and the wind turbine component 28*a* is within the maximum working distance 72 of the crane 26.

Figure 2D:
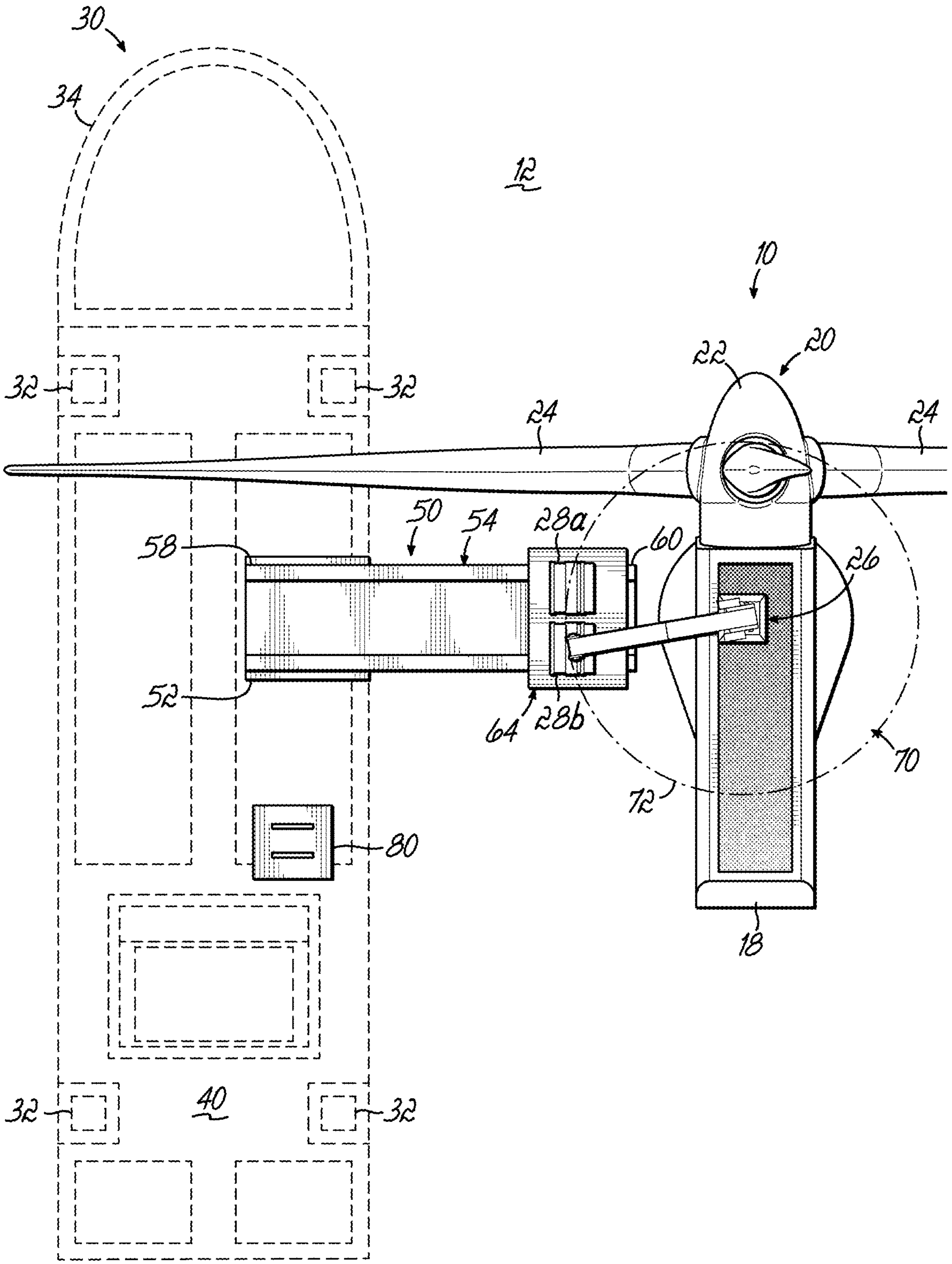

In FIG. 2D, the crane 26 has lifted the wind turbine component 28*b* out of the nacelle 18, lowered it down, and placed it onto the transport frame 56*b*.

Figure 2E:
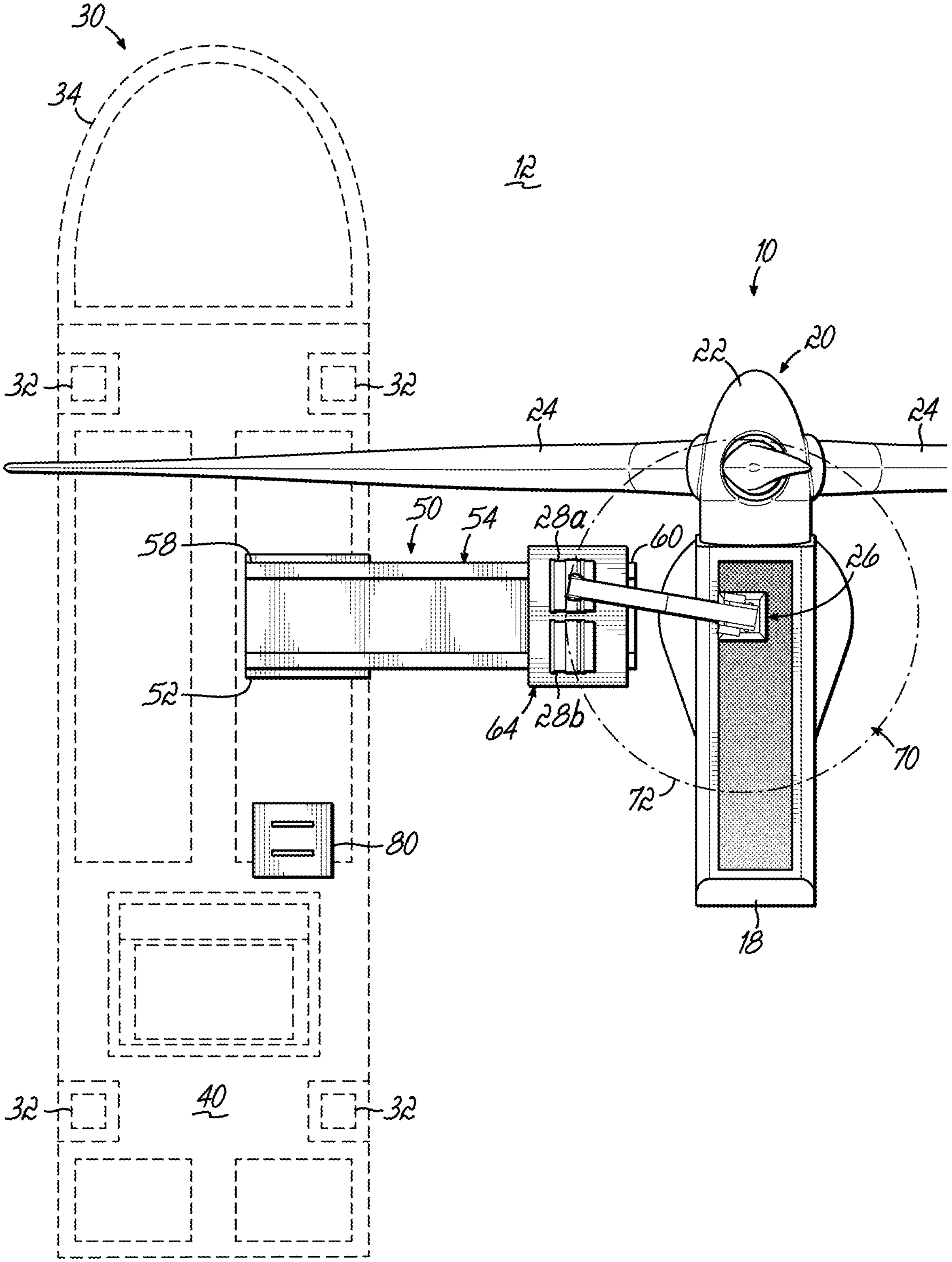

In FIG. 2E, the crane 26 has been disconnected from wind turbine component 28*b* and has been connected to wind turbine component 28*a*, which is positioned on transport frame 56*a*.

Figure 2F:
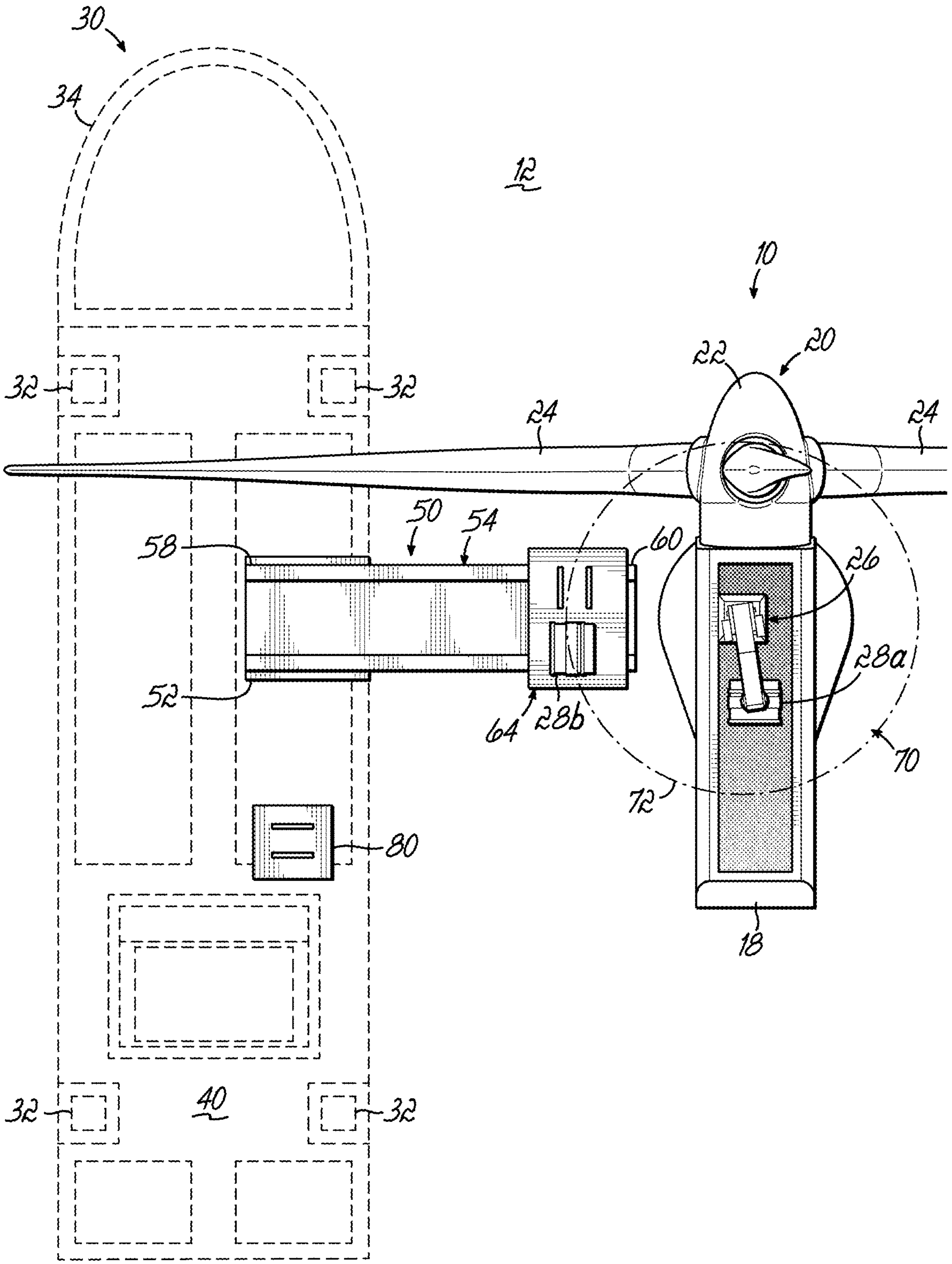
Figure 2G:
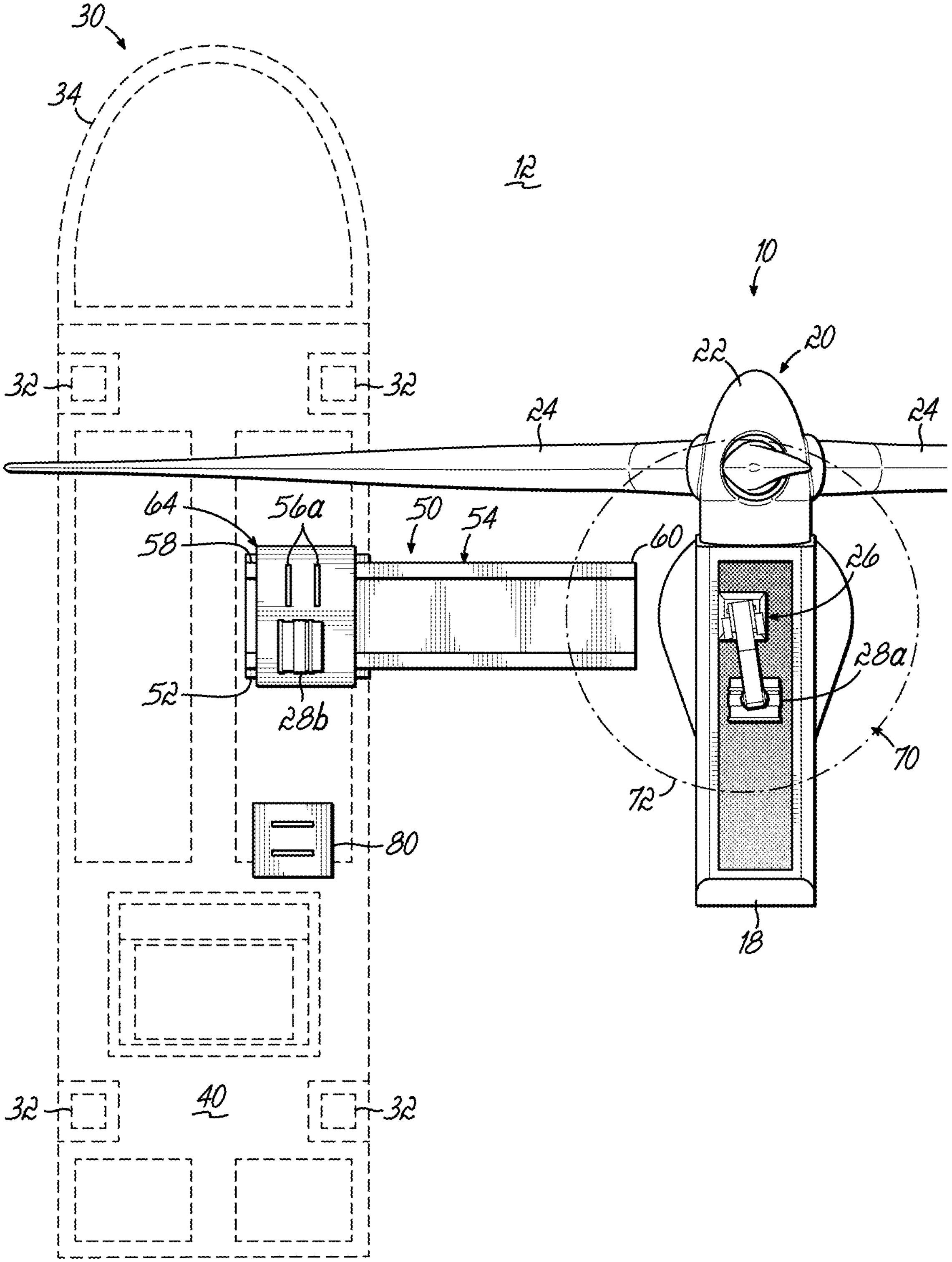

In FIG. 2F, the wind turbine component 28*a* has been lifted by the crane 26 and placed inside the nacelle 18.

In FIG. 2G, the carriage 64 has been moved from the extended position to the retracted position such that the wind turbine component 28*b* is now located over the deck 40 of the jack-up vessel 30. In the retracted position, the wind turbine component 28*b* may be removed from the carriage 64 of the transport system 50 and placed in a holding frame 80 that previously held wind turbine component 28*a* (FIG. 2A). With the wind turbine component 28*b* removed from the carriage 64, another wind turbine component (not shown) may be placed on either of the transport frames 56*a*, 56*b* and the carriage 64 with the transport frames 56*a*, 56*b* may be moved from the retracted position to the extended position such that this other wind turbine component is located over the water. Again, in the extended position, at least part of the transport frames 56*a*, 56*b* is within the maximum working distance 72 of the of the crane 26. With the transport frames 56*a*, 56*b* in the extended position, the crane 26 may deposit another "old" wind turbine component on a transport frame 56*a*, 56*b* and lift the other wind turbine component from the transport frame 56*a*, 56*b* up to the nacelle 18.

Figure 3:
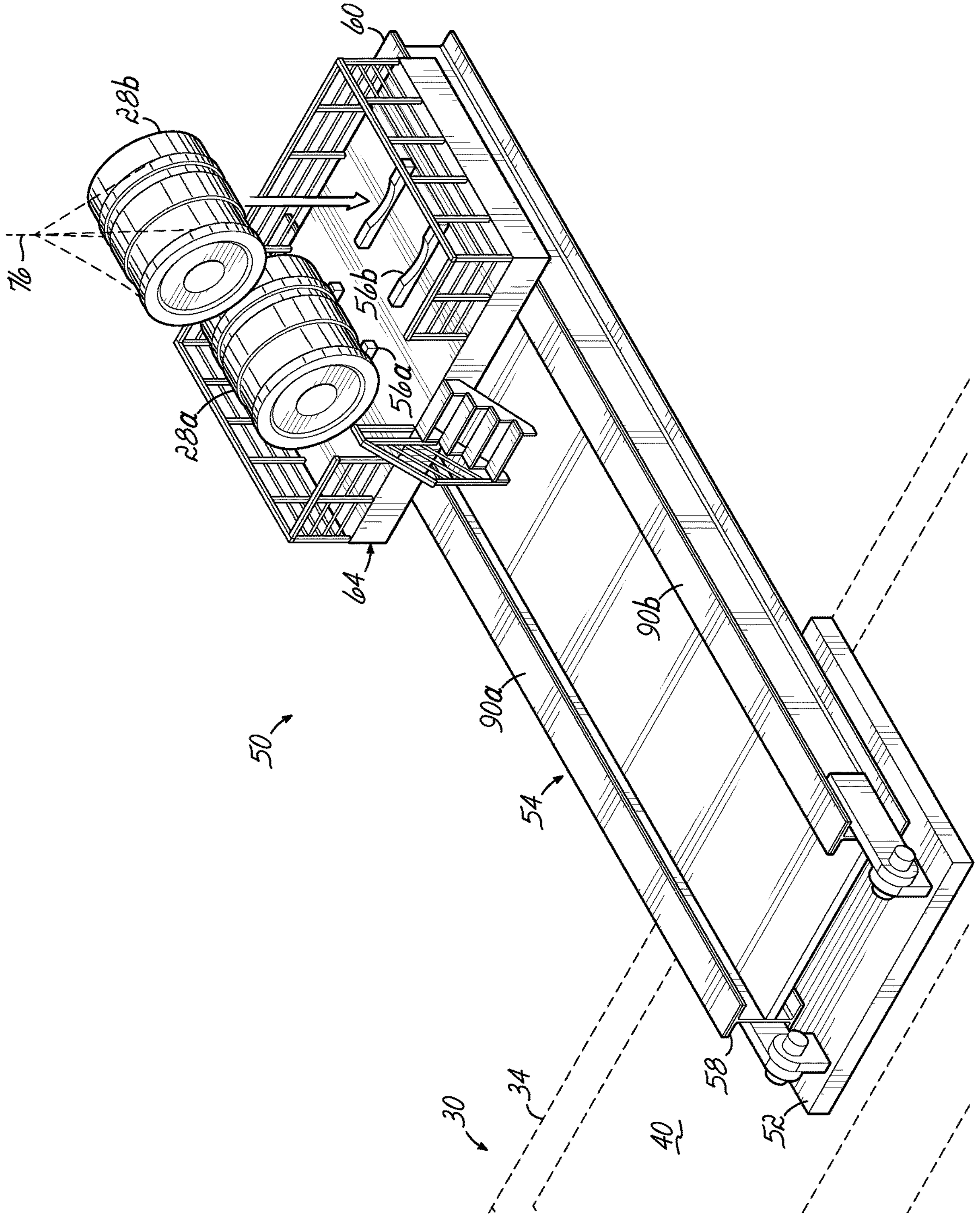
FIG. 3 is a perspective view of the transport system of FIG. 2A with a component being lowered next to another component already positioned on a transport frame of the transport system, the two components to be arranged side-by-side in a transverse direction.
Figure 4:
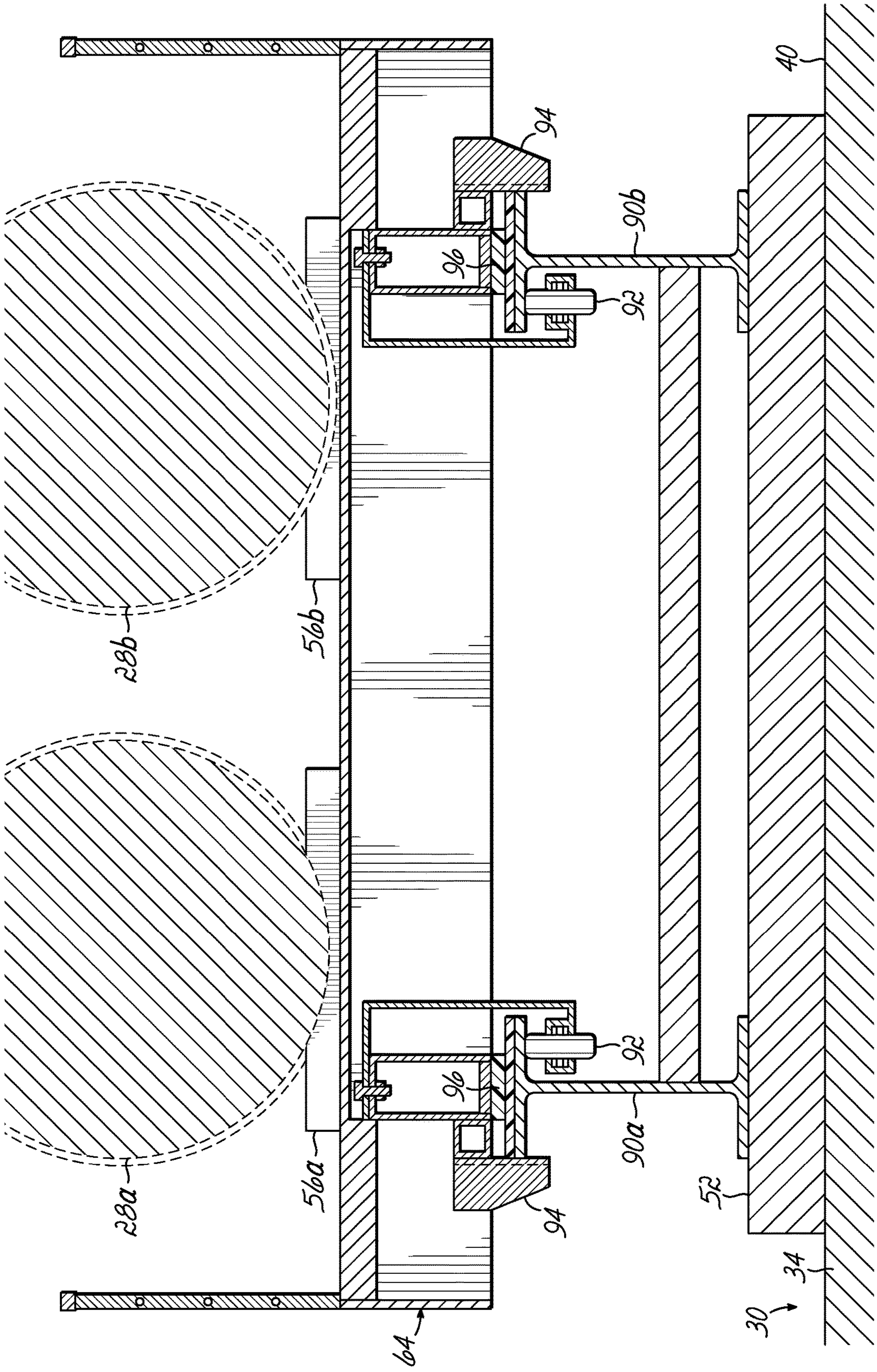
FIG. 4 is a cross-sectional view of the transport system of FIG. 3.

In one embodiment, the platform 54 includes tracks 90*a*, 90*b* as illustrated in FIGS. 3 and 4. The carriage 64 is movably connected to the tracks 90*a*, 90*b* via wheels 92 and side guides 94. The carriage 64 moves along a slide pad 96 which is positioned between the top of the tracks 90*a*, 90*b* and the underside of the carriage 64. In FIG. 3, and in one embodiment, the transport frames 56*a*, 56*b* may be fixed relative to the carriage 64. In another embodiment, the carriage 64 may be wider in the transverse direction and the transport frames 56*a*, 56*b* may be configured to move in the transverse direction relative to the carriage 64. This configuration allows the wind turbine components 28*a*, 28*b* to be moved transversely so that one of the wind turbine components 28*a*, 28*b* may be position directly under the lift line 74 of the crane 26. Alternatively, the carriage 64 may be configured to move transversely relative to the platform 54 so one of the wind turbine components 28*a*, 28*b* may be position directly under the lift line 74 of the crane 26.

Figure 5:
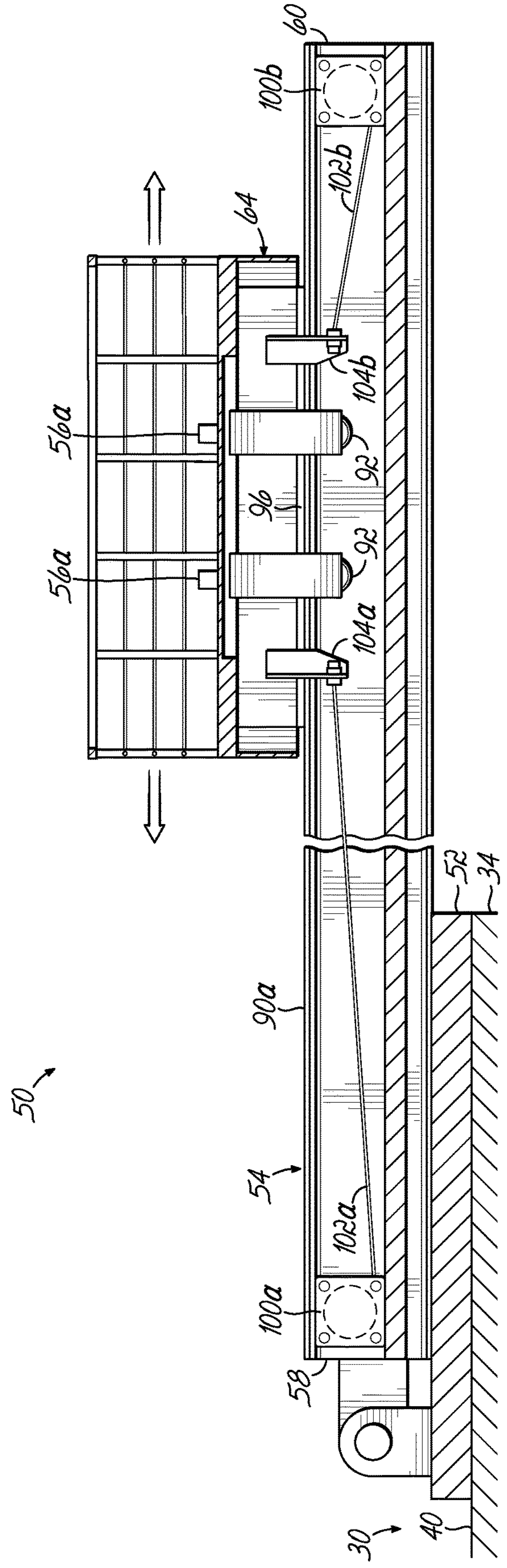
FIG. 5 is a partial cross-sectional elevational view of a transport system according to one embodiment of the invention.

FIG. 5 illustrates an embodiment of the transport system 50 with the carriage 64 connected to two drive devices 100*a*, 100*b*, such as winches, positioned at opposing ends of the platform 54. The drive devices 100*a*, 100*b* have cables or ropes 102*a*, 102*b* extending to attachment members 104*a*, 104*b* that are connected to the carriage 64. In use, one of the drive devices 100*a*, 100*b* operates to wind its cable 102*a*, 102*b* so as to move the carriage 64 along the tracks 90*a*, 90*b* in the direction of the operative drive device 100*a*, 100*b*. The other drive device 100*a*, 100*b* may then be used to move the carriage 64 along the tracks 90*a*, 90*b* in the opposite direction. The carriage 64 may be moved along the tracks 90*a*, 90*b* in any other suitable manner such as with a rack and opinion drive, hydraulic pistons, gear motors, and the like.

Figure 6:
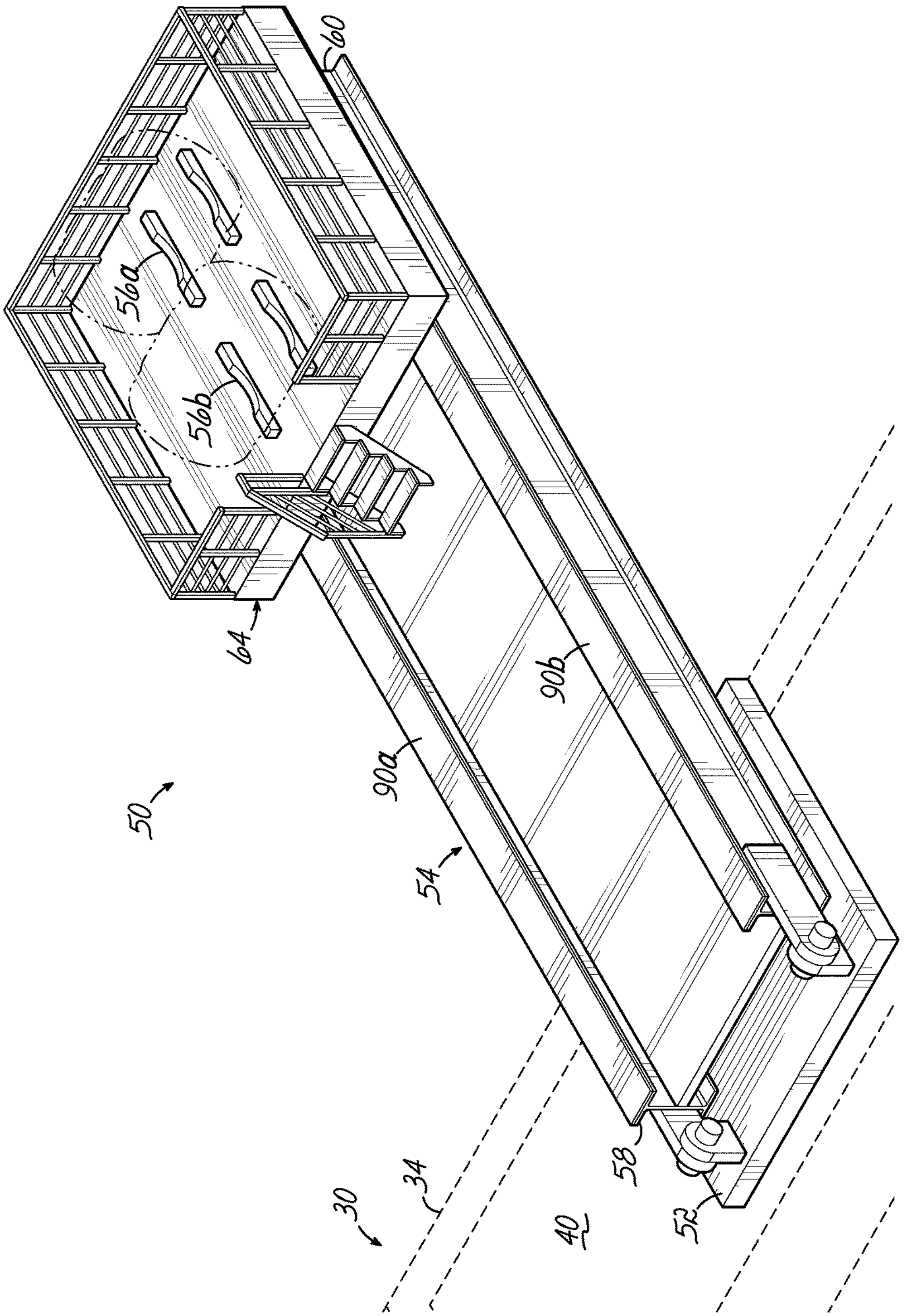
FIG. 6 is a transport system configured to hold two components side-by-side in a longitudinal direction according to another embodiment of the invention.

In FIGS. 2-5, the transport frames 56*a*, 56*b* are arranged such that the wind turbine components 28*a*, 28*b* sit side-by-side each other in the transverse direction, i.e., perpendicular to the elongate extend of the platform 54. In FIG. 6, the transport frames 56*a*, 56*b* are arranged such that the wind turbine components 28*a*, 28*b* are side-by-side each other in the longitudinal direction, i.e., parallel to the elongate extent of the platform 54. In the arrangement in FIG. 6, the lift line 74 of the crane 26 may not be able to pick up both wind turbine components 28*a*, 28*b* for a given position of the platform 54. Consequently, the carriage may need to be moved in the longitudinal direction to allow a particular wind turbine component 28*a*, 28*b* to be positioned under the lift line 74 of the crane 26 depending on the maximum working distance 72 of the crane 26.

Figure 7:
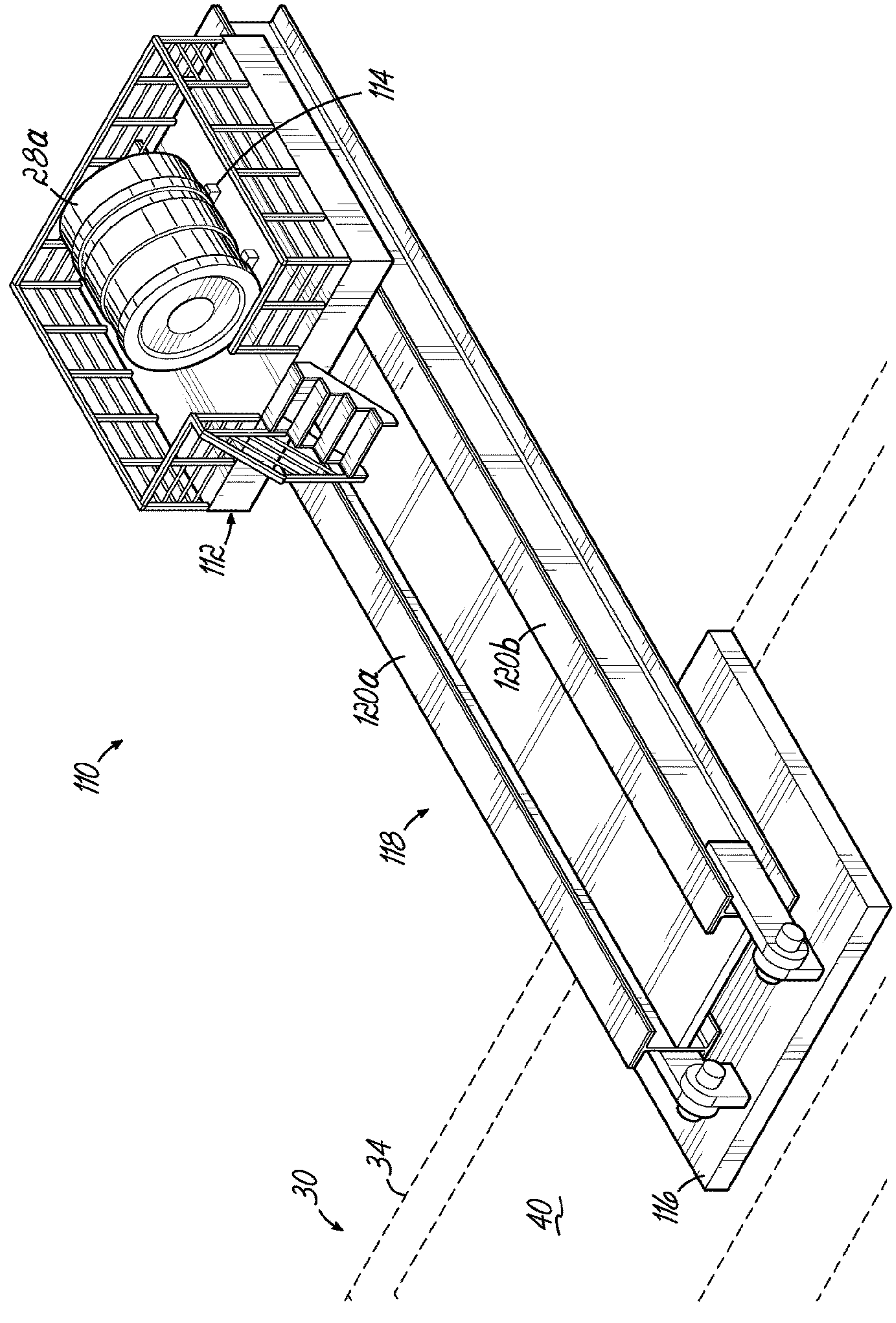
FIG. 7 is a transport system configured to hold one component according to another embodiment of the invention.

FIG. 7 shows a transport system 110 according to another embodiment of the invention. The transport system 110 is similar in construction and operation as the transport system 50, but the transport system 110 has a carriage 112 with only one transport frame 114. The transport system 110 includes a base 116, a platform 118 with tracks 120*a*, 120*b*. In use, the carriage 112 can move only one wind turbine component 28*a*, 28*b* at a time along platform 118. Consequently, the carriage 112 must be moved to the extended position with nothing in the transport frame 114 so that the wind turbine component 28*b* in the nacelle 18 may be lowered down and placed on the transport frame 114. The carriage 112 is then moved to the retracted position and the wind turbine component 28*b* is removed from the transport frame 114. Next, the wind turbine component 28*a* is placed on the transport frame 114 and the carriage is moved back to the extended position. Then, the crane 26 lifts the wind turbine component 28*a* up to the nacelle 18. In other words, in this embodiment, wind turbine components are moved in a serial manner, rather than a parallel manner as provided when the transport system includes two transport frames.

Figure 8A:
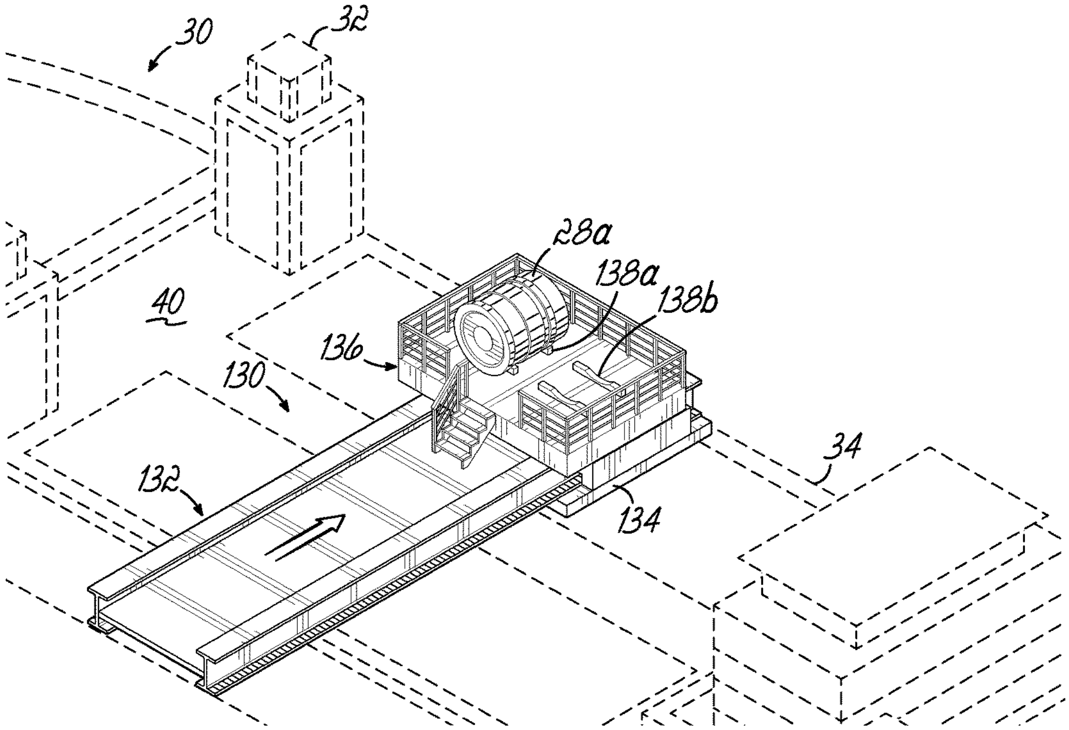
FIG. 8A is a transport system according to another embodiment of the invention with the platform in a retracted position.
Figure 8B:
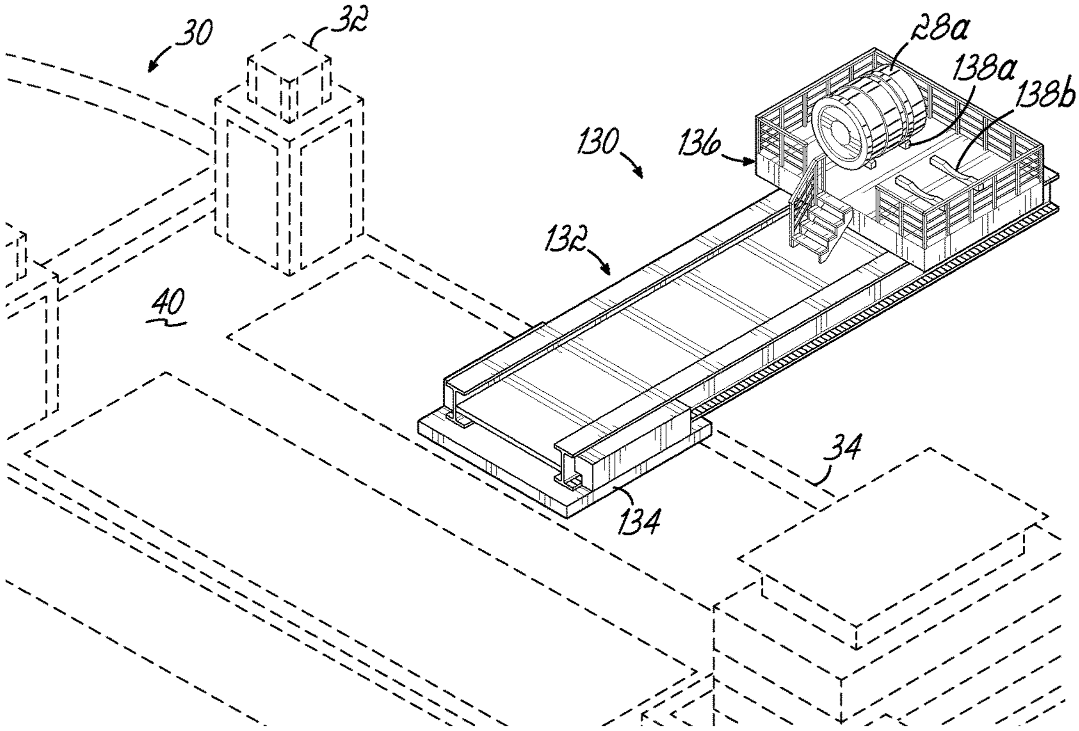
FIG. 8B is the transport system of FIG. 8A with the platform in an extended position.

In the previous embodiments, the platforms 54, 118 were fixed relative to the respective bases 52, 116 and the carriages 64, 112 moved relative to the platforms between the retracted position and the extended position. FIGS. 8A and 8B illustrate another embodiment of the invention where a transport system 130 includes a platform 132 that moves relative to a base 134. That is, to move wind turbine components 28*a*, 28*b* between the retracted position and the extended position, the entire platform 132 moves relative to the base 134. In one embodiment, the platform 132 includes a carriage 136 that is fixed to the platform 132 and, thus, not movable relative to the platform 132 like carriages 62, 112. The carriage 136 includes a pair of transport frames 138*a*, 138*b* to receive and hold wind turbine components 28*a*, 28*b* while they are moved between retracted and extended positions. The platform 132 may be moved relative to the base 134 in any suitable manner such as with one or more winches, a rack and opinion drive, hydraulic pistons, and the like. In another embodiment, the carriage may be omitted and the transport frames 138*a*, 138*b* connected directly to the platform (not shown).

In any event, this embodiment may provide a number of advantages. For example, because the transport system 130 may be self-contained on the deck of the sea vessel (e.g., not having parts extending from the deck during transit of the sea vessel), the platform 132 may be assembled to the base 134 before the sea vessel ever leaves port. Additionally, the "new" wind turbine component 28*a* may be loaded onto its respective transport frame 138*a* at quay side instead of once the sea vessel 30 reaches the offshore wind turbine 10. This, in turn, may eliminate the need for a crane on the sea vessel for moving wind turbine components on and off of the transport system, which may reduce the cost, size, and complexity of the particular sea vessel used to conduct the repair or replacement process.

Figure 9A:
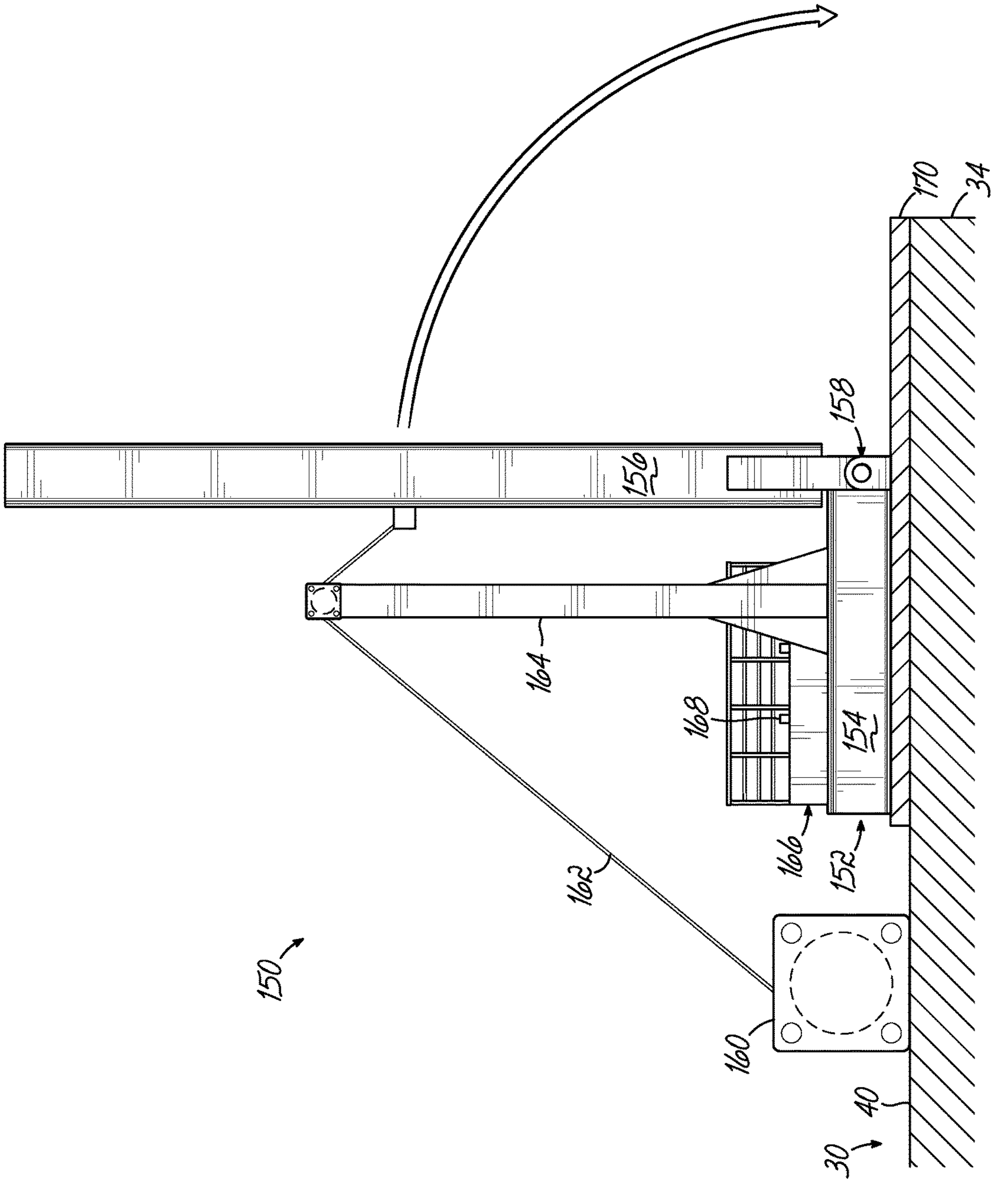
FIG. 9A is an elevation view of a transport system according to another embodiment of the invention with a second platform section in a raised position.
Figure 9B:
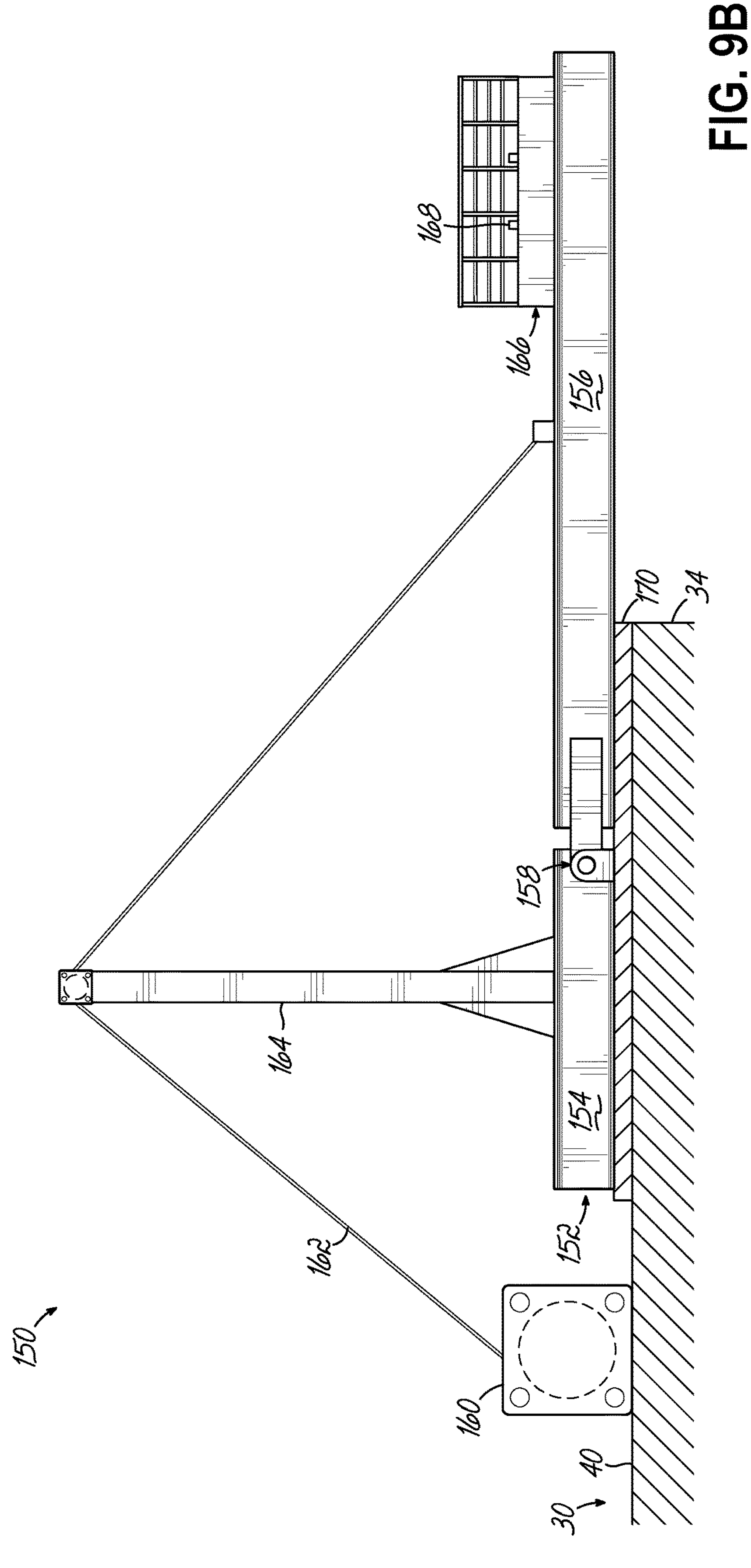
FIG. 9B is an elevational view of the transport system of FIG. 9A with the second platform section in a lowered position.

FIGS. 9A and 9B illustrates a transport system 150 according to another embodiment of the invention. In this embodiment, the transport system 150 includes a platform 152 having a first platform segment 154, a second platform segment 156, and a pivot mechanism 158 that connects the first platform segment 154 to the second platform segment 156. The pivot mechanism 158 is configured to permit rotational movement of the second platform segment 156 relative to the first platform segment 154 between a raised position (FIG. 9A) and a lowered position (FIG. 9B). To assist with raising and lowering the second platform segment 156, a drive device 160, such as a winch, connects to the second platform segment 156 via cable or rope 162. The cable or rope 162 may be routed over a vertical stanchion 164. The transport system 150 further includes a carriage 166 with transport frames 168 for holding a wind turbine component 28*a*, 28*b*. The carriage is movable relative to the first and second platform segments 154, 156 between a retracted position (FIG. 9A) and an extended position (9B), where in the extended position at least part of the transport frames 168 is within the maximum working distance 72 of the crane 26. The transport system 150 also includes a base 170 that is attached to the deck 40 of the sea vessel 30.

In use, the transport system 150 may be transported on the deck 40 of the sea vessel 30 with the second platform segment 156 in the raised position. When the sea vessel is positioned adjacent the wind turbine 10, the second platform segment 156 may be moved to the lowered position using the drive device 160 and the wind turbine component 28*a* may be placed on one of the transport frames 168 in the carriage 166, which is in the retracted position. Alternatively, the wind turbine component 28*a* may be positioned on the carriage 166 quay side so that the sea vessel 30 does not require a crane or other lifting apparatus. In any event, the carriage 166 is then moved to the extended position. The wind turbine component 28*b* in the nacelle 18 is lifted out of the nacelle 18 by the crane 26 and lowered down and placed on the other transport frame 168. The crane then lifts the wind turbine component 28*a* up to the nacelle 18. The carriage 166 is then moved to the retracted position and the wind turbine component 28*b* is either removed from the transport frame 168 or retained on the transport frame 168 (e.g., such as in a single component replacement). For a multi-component replacement, once the wind turbine component 28*b* is removed from the transport frame 168, this process may continue until all old/worn/damaged wind turbine components 28*b* have been replaced with new/repaired wind turbine components 28*a*. Prior to leaving the wind turbine 10, the drive device 160 may lift the second platform segment 156 back to the raised position for transit of the sea vessel 30.

Figure 10:
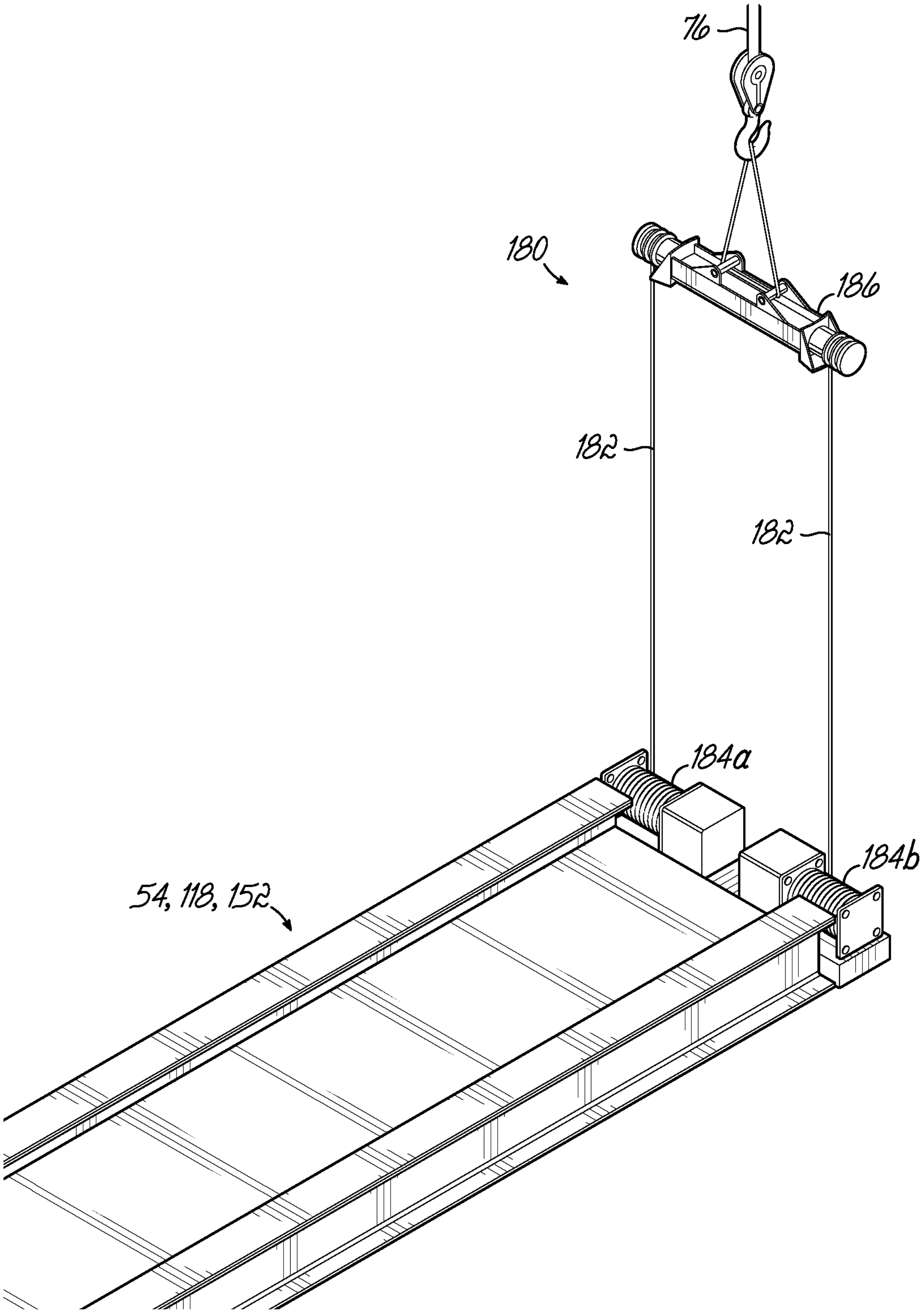
FIG. 10 is a perspective view of a platform of any of the transport systems with a control line assembly coupled to the end of the platform.

When lifting or lowering one of the wind turbine components 28*a*, 28*b*, it is common to use tow lines attached to the wind turbine components 28*a*, 28*b* to help stabilize the wind turbine components 28*a*, 28*b* during lifting and lowering. FIG. 10 illustrates a tow line assembly 180 attached to the distal end of any of the platforms 54, 118, 152 discussed above. The tow line assembly 180 includes a pair of tow lines 182 attached at one end to drive mechanisms 184*a*, 184*b* and to a cross member 186 at the other end which is configured to be removably connected to the lift line 74 of the crane 26. When the wind turbine component 28*b* is to be lowered from the nacelle 18, the lift line 74 is first connected to the cross member 186 and the tow line assembly 180 is lift up to the nacelle 18. The ends of the tow lines 182 are then attached to the wind turbine component 28*b*. As the wind turbine component 28*b* is lowered, the drive mechanisms 184*a*, 184*b* reel in the tow lines 182 so that a sufficient amount of tension is present in the tow lines 182 to help stabilize the wind turbine component 28*b* and prevent it from spinning or contacting the tower 14 of the wind turbine 10. Similarly, when lifting the wind turbine component 28*a* up to the nacelle 18, the tow lines 182 are attached to the wind turbine component 28*a* and tension is maintained in the tow lines 182 by controlling the drive mechanisms 184*a*, 184*b* during the lift.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A method of replacing a component of an offshore wind turbine, the offshore wind turbine including an onboard crane having a maximum working distance, the method comprising:

providing a sea vessel adjacent the offshore wind turbine including a transport system unattached to the wind turbine, the transport system comprising:

a base connected to a deck of the sea vessel;

an elongate platform connected to the base for supporting the platform; and at least one transport frame carried on the elongate platform for receiving a component of the offshore wind turbine and being movable relative to the base between a retracted position and an extended position, the retracted position locating the at least one transport frame over the deck of the sea vessel, and the extended position locating the at least one transport frame over water at a distance (d) away from the deck of the sea vessel, wherein the sea vessel is positioned such that the deck of the sea vessel is separated from the wind turbine by a distance (D) greater than the maximum working distance of the onboard crane, and wherein the sea vessel is positioned such that when the at least one transport frame is in the extended position, at least part of the at least one transport frame is within the maximum working distance of the onboard crane and when the at least one transport frame is in the retracted position, the at least one transport frame is outside of the maximum working distance of the onboard crane;

arranging the at least one transport frame in the extended position;

lowering a component of the offshore wind turbine using the onboard crane; and with the at least one transport frame in the extended position, placing the component on the at least one transport frame of the transport system.

2. The method of claim 1, further comprising:

moving the at least one transport frame from the extended position to the retracted position such that the component is located over the deck of the sea vessel; and with the at least one transport frame in the retracted position, removing the component from the transport system.

3. The method of claim 1, further comprising:

placing another component on the at least one transport frame of the transport system; and moving the at least one transport frame from the retracted position to the extended position such that the another component is located over water.

4. The method of claim 3, further comprising, with the at least one transport frame in the extended position, raising the another component from the at least one transport frame using the onboard crane of the offshore wind turbine.

5. The method of claim 3, wherein the at least one transport frame includes a first transport frame and a second transport frame, and wherein the step of placing the component on the at least one transport frame further comprises placing the component on the first transport frame;

wherein the step of placing the another component on the at least one transport frame further comprises placing the another component on the second transport frame, and wherein the another component is placed on the second transport frame prior to the component being placed on the first transport frame.

6. The method of claim 2, wherein the at least one transport frame is fixed to the platform, and wherein moving the at least one transport frame between the extended position and the retracted position further comprises moving the platform relative to base.

7. The method of claim 2, wherein the platform includes a track, and wherein the transport system further comprises a carriage movably connected to the track, the carriage including the at least one transport frame, and wherein moving the at least one transport frame between the extended position and the retracted position further comprises moving the carriage relative to the track.

8. The method of claim 1, wherein the platform includes a first platform segment and a second platform segment, the second platform segment being rotatably coupled to the first platform segment and rotatable between a raised position and a lowered position, and wherein the method further comprises positioning the second platform segment in the lowered position prior to or contemporaneous with the step of arranging the at least one transport frame in the extended position.

9. A transport system for handling components of an offshore wind turbine on a sea vessel, comprising:

a base for connection to a deck of the sea vessel;

an elongate platform configured to be connected to the base for supporting the platform and remain unattached to the wind turbine during use; and at least one transport frame for receiving a component of the offshore wind turbine, wherein the at least one transport frame is configured to be movable relative to the base between a retracted position and an extended position, the retracted position locating the at least one transport frame over the deck of the sea vessel, and the extended position locating the at least one transport frame over water at a distance (d) away from the deck of the sea vessel.

10. The transport system of claim 9, wherein the at least one transport frame is fixed to the platform, and wherein the platform is movable relative to the base to move the at least one transport frame between the retracted position and the extended position.

11. The transport system of claim 9, wherein the platform includes a track and the transport system further comprises a carriage configured to be movably connected to the track, the carriage including the at least one transport frame and being movable relative to the track to move the at least one transport frame between the retracted position and the extended position.

12. The transport system of claim 9, further comprising a drive device for moving the at least one transport frame between the retracted position and the extended position.

13. The transport system of claim 9, wherein the at least one transport frame includes a first transport frame and a second transport frame arranged in a side-by-side manner.

14. The transport system of claim 13, wherein the platform defines a longitudinal direction parallel to the elongate extent of the platform, and wherein the first and second transport frames are arranged side-by-side in the longitudinal direction.

15. The transport system of claim 13, wherein the platform defines a transverse direction perpendicular to the elongate extent of the platform, and wherein the first and second transport frames are arranged side-by-side in the transverse direction.

16. The transport system of claim 9, wherein the platform further comprises:

a first platform segment;

a second platform segment; and a pivot mechanism connecting the first platform segment and the second platform segment and permitting rotational movement of the second platform segment relative to the first platform segment between a raised position and a lowered position.

17. A sea vessel, comprising:

a deck; and the transport system of claim 9 positioned on the deck.

* * * * *